United States Patent Office 3,256,257
Patented June 14, 1966

3,256,257
COCRYSTALLIZED COPPER CATALYST FOR THE POLYMERIZATION OF OLEFINS
Perry A. Argabright, Littleton, Colo., and Edwin A. Schmall, Murray Hill, N.J., assignors to Esso Research and Engineering Company, a corporation of Delaware
No Drawing. Filed Apr. 30, 1964, Ser. No. 363,972
18 Claims. (Cl. 260—88.2)

This application is a continuation-in-part of copending patent application Serial No. 851,245, filed November 6, 1959, now U.S. Patent 3,161,604.

This invention relates to the preparation of novel catalysts for the polymerization of alpha olefins. More particularly, this invention relates to the partial reduction of transition metal compounds with copper metal and to the activation of the resulting cocrystallized compound with organo-metallic compounds and their use as catalysts for the polymerization of alpha olefins.

The low-pressure polymerization and copolymerization of alpha olefins with catalyst systems made up of a partially reduced heavy transition metal halide and a reducing metal-containing compound to high density, often isotactic, high molecular weight, solid, relatively linear products is now well known, see, e.g., Belgian Patent 533,362, "Chemical and Engineering News," April 8, 1957, pages 12 through 16, and "Petroleum Refiner," December 1956, pages 191 through 196.

One of the most active catalysts of the above type was found to be crystalline titanium chloride cocrystallized with aluminum chloride. This catalyst has been prepared by a number of methods; see, for example, Serial No. 766,376 filed October 10, 1958, to E. Tornqvist and A. W. Langer, Jr., now Patent 3,032,513.

It has now surprisingly been found that when a transition metal halide such as titanium tetrachloride is partially reduced with finely divided copper metal and activated with an organo-metallic compound a very highly active catalyst is formed for the polymerization and copolymerization of alpha olefins. The cocrystallized catalyst is also suitable for use in the polymerization of alpha olefins with non-conjugated diolefins. This catalyst, when used to polymerize propylene for example, gives a higher catalyst activity than any previously reported propylene polymerization catalyst, and additionally produces an excellent grade of high crystallinity polypropylene.

The process for preparing the catalyst of the invention is carried out by forming a slurry of from 1 to 7 moles of a transition metal compound with one mole of finely divided copper metal in an inert diluent and heating the slurry at a temperature in the range of 80° to 200° C., preferably 50 to 150° C. Neither the reduction temperature nor the reaction time is critical. The reaction time is generally in the range of 0.25 to 24 hours, preferably 1 to 6 hours, depending on the temperature of reaction utilized.

The powdered copper metal used in the process is a finely divided copper metal such as electro-plated copper dust. In general, the particle size of the copper metal is in the range of 1–100 microns.

The diluents used for the reduction are straight and branched chain aliphatic hydrocarbons and aromatic hydrocarbons. Examples of the aliphatic hydrocarbons are n-heptane, n-hexane, n-decane, neopentane, isoheptane, etc. The aromatic hydrocarbons are the preferred diluents for use in the reduction reaction and examples of these are benzene, toluene, xylene, mesitylene, pseudocumene, ethylbenzene, cymene, tetralin, decalin, chlorobenzene, o-dichlorobenzene, orthochlorotoluene and the like. Benzene and toluene are particularly preferred since these diluents form only minimal amounts of resins during the reduction reaction. When a temperature above the boiling point of the diluent is chosen for the reduction, pressure is employed to the extent necessary to maintain the diluent in liquid form.

The structure of the product obtained by reducing $TiCl_4$ with copper metal was proven to be predominantly $TiCl_3$ cocrystallized with $CuCl$. The general class of transition metal compounds utilized for the reduction is such that the product of the reduction will be a partially reduced transition metal compound cocrystallized with the corresponding cuprous compound. For example, when $VBr_4$ is reduced with copper metal, the final product is mainly $VBr_3 \cdot CuBr$. Also, transition metal compounds in a lower oxidation state prepared by the above reduction process are within the scope of the invention. For example, $TiCl_2 \cdot CuCl$ or $TiCl \cdot CuCl$ can be prepared by reducing $TiCl_3$ and $TiCl_2$ respectively with copper powder.

The transition metal compounds useful in the present reduction are the transition metals of Groups IV–A and V–A according to the Periodic Chart of Henry D. Hubbard revised Edition 1956; for example, titanium, zirconium, hafnium, vanadium, niobium and tantalum. The transition metal compounds are halides and oxyhalides such as the chlorides, bromides, iodides, oxychlorides, etc. The ratio of partially reduced metal halide to cuprous halide in the reduction product is predominately unity although this invention is not limited to this ratio. Ratios of titanium halide to cuprous halide can range from about 1 to 3 moles of titanium halide per mole of cuprous halide.

The partially reduced transition metal compound cocrystallized with the corresponding cuprous compound is present in finely divided form in the diluent used in the reduction. The diluent can be separated from the catalyst component for purification purposes by a simple low vacuum filtration. The following alternative procedures can be employed to prepare the complete catalyst therefrom: (1) the reaction mixture can be treated directly with an organo-metallic compound to activate the reduction product; or more preferably, for facile polymerization, (2) the partially reduced transition metal compound cocrystallized with the corresponding cuprous compound can be isolated from the reaction mixture, such as by filtering, preferably at or close to the temperature of the reduction, then pebble-milled or preferably metal ball-milled when dry to produce a highly active catalyst component, and thereafter slurried in a hydrocarbon diluent and treated with an organo-metallic compound. Extremely effective catalysts are obtained by steel ball-milling the transition metal compound-copper reduction product prior to use. The time of milling necessary to activate the catalyst will depend upon the efficiency of the milling equipment. Generally milling periods varying from about 2 hours to 10 days are used with large commercial milling equipment. However, milling periods ranging from 5 hours to 3 days will be more common.

When the second procedure is used, the hydrocarbon diluent that can be used to slurry the ball-milled catalyst component includes paraffinic hydrocarbons such as propane, isopentane, heptane, decane or other saturated petroleum or synthetic hydrocarbon oils, e.g., white mineral oil, naphthenes such as methyl cyclohexane or decalin, aromatics such as benzene, xylene, and the like. However, aromatic hydrocarbons are usually preferred.

A large number of organo-metallic compounds can be used to activate the cocrystallized partially reduced transition metal compound. Among the most valuable are alkyl aluminum compounds, especially trialkyl aluminum compounds such as triethyl aluminum, tripropyl aluminum, triisobutyl aluminum, and the like. Dialkyl aluminum compounds such as diethyl aluminum halides, diethyl aluminum chloride in particular, dipropylhalides, diisobutyl halides, and the like can also be used. Monoalkyl aluminum compounds can be employed. Generally in addition to trialkyl or triaryl aluminum compounds, organo-aluminum compounds having one or two hydrocarbon radicals, and two or one electronegative groups, such as halogen, alkoxy, organic nitrogen or sulfur groups, and the like can also be used. Organo-metallic compounds other than aluminum compounds that can be employed include $InEt_3$, $GaEt_3$, $BeEt_2$, and $ZnEt_2$. Systems of aluminum trialkyls, e.g. aluminum triethyl, with the above reduction product are particularly preferred and useful. The reduction product is treated in a non-oxidizing atmosphere with one or more of the above organo-metallic compounds in a mole ratio of 0.1 to 10 moles, preferably 1 to 3 of organo-metallic compound per mole of the reduction product at a temperature in the range of 25° to 135° C. The temperature is not critical although elevated temperatures which will result in decomposition of either or both of the components should of course not be used.

The polymerization and copolymerization of alpha olefins having from 2 to about 20 carbon atoms such as ethylene, propylene, butene-1, 3-methylbutene-1, 4-methylhexene-1, heptene-1, dodecene-1, styrene and the like, as well as the polymerization of at least one of said olefins with a $C_6$ to $C_{15}$ non-conjugated diolefin such as 1,4 - hexadiene, dicyclopentadiene, 5 - methylene - 2 - norbornene, 3(2'-methyl-1-propene) cyclopentene, 3(2'-methyl-2-propene) cyclopentene, tetrahydroindene, etc., is carried out by contacting the olefins used with the catalyst mixture of the invention in a hydrocarbon solvent at a temperature of 0 to 150° C., preferably 70 to 130° C. and at pressures ranging from about 0 to 150 p.s.i.g., preferably atmospheric pressure in batch or continuous operation. For copolymerizations wherein at least one alpha olefin is polymerized with a non-conjugated diolefin, the reaction temperature should be maintained at about −40 to 150° C., preferably 20 to 100° C. Alpha olefins having from 3 to 5 carbon atoms are preferred for use with the catalysts of the invention since these alpha olefins form highly stereoregular polymers. The catalyst slurry is preferably diluted with additional solvent to provide a catalyst concentration for the polymerization of about 0.1 to 0.5 wt. percent, based on the weight of the solvent present. The polymer product concentration in the polymerization reaction mixture is preferably kept between about 2 and 25 wt. percent, based on the total contents present, so as to provide for easy handling of the polymerized mixture. When the desired quantity of polymer has been obtained, a $C_1$ to $C_8$ alkanol such as isopropyl alcohol or n-butyl alcohol, desirably in combination with a chelating agent such as acetylacetone or diacetyl is added to the reaction mixture to dissolve and deactivate the catalyst and to precipitate the polymer product from solution. The polymer product is then filtered and can be further washed with alcohol or an acid such as hydrochloric acid and dried, compacted, and packaged. It is important that the polymerization reaction be carried out in the absence of catalyst poisons such as water, oxygen, sulfur compounds, and the like.

The invention will be better understood by reference to the following examples which are given for illustration purposes only and are not meant to limit the invention.

*Example I*

A slurry of 25 g. of copper dust in 350 ml. of toluene was heated to reflux with stirring under a nitrogen atmosphere. A solution of 173 g. of $TiCl_4$ in 150 ml. of toluene was added dropwise to the above mixture over a period of 45 minutes. The reaction was exothermic and a color change in the slurry took place from copper color to red-brown. The reaction mixture was then refluxed with stirring for an additional 17.5 hours. The resulting mixture was then cooled to room temperature, the solid product collected by filtration in a nitrogen atmosphere, triturated with an additional 500 ml. of fresh toluene, and refiltered. The resulting solid, deep purple in color, was washed with about 1 l. of n-heptane until the filtrate became colorless. After drying under vacuum at room temperature for four hours, the solid weighed 90.3 g., which is a yield of 90.5% based on $TiCl_3 \cdot CuCl$ as the product. The product was then ball-milled dry for three days, added to dry xylene, and 2 moles of triethyl aluminum added per mole of $TiCl_3 \cdot CuCl$. Propylene was then passed through the catalyst mixture in the xylene diluent at a temperature of about 71 to 75° C. at atmospheric pressure for 127 minutes. The reaction was then stopped and 2 liters of methanol added to precipitate the polymer. The polymer was then filtered and dried. Details of the catalyst preparation and the polymerization reaction are given in Table I.

Additional samples of the $TiCl_3 \cdot CuCl$ catalyst component of Example I were activated with the quantities of $AlEt_3$ given in Table I. These catalysts were then used to polymerize propylene. The details of the polymerizations and the polymer products are also given in Table I.

*Examples V through VII*

In order to show the advantages of the catalyst of the invention over (1) activated CuCl, (2) activated $TiCl_3$, and (3) an activated physical mixture of $TiCl_3$ and CuCl, polymerization reactions were carried out with the above catalyst components activated with $AlEt_3$ under conditions similar to those used in Examples I through IV. Details of these examples are given in Table I for comparison purposes.

TABLE I.—ATMOSPHERIC PRESSURE POLYMERIZATION OF PROPYLENE USING 3-DAY BALL MILLED CATALYSTS

| Ex. | Catalyst | Al/Cu | AlEt₃-M×10³ | Temp., °C. | Polymerization Time, Min. | Polymer Yield, g. | Cat. Eff.[a] g./g./2 hrs. |
|---|---|---|---|---|---|---|---|
| I | TiCl₃·CuCl | 2 | 5.0 | 71–5 | 127 | 187.8 | 486 |
| II | TiCl₃·CuCl | 2 | 5.0 | 75–6 | 60 | 86.1 | [b] 446 |
| III | TiCl₃·CuCl | 2 | 2.5 | 70 | 90 | 50.6 | [b] 350 |
| IV | TiCl₃·CuCl | 1 | 2.5 | 75 | 120 | 34.4 | 90 |
| V | CuCl | 2 | 5.0 | 74 | 90 | 0 | 0 |
| VI | TiCl₃ [c] | [d] | 5.0 | 75 | 120 | 62.0 | 161 |
| VII | TiCl₃+CuCl [e] | 2 | 5.0 | 75 | 120 | 57.3 | 149 |

| Polymer | Polymer Properties | | | |
|---|---|---|---|---|
| | Intrinsic Viscosity | Mol. Wt. ×10⁻³ | Density | Tensile Strength, p.s.i.g. |
| I | 2.54 | 160 | 0.8956 | 3,595 |
| II | 2.16 | 125 | 0.8975 | 3,850 |
| III | 1.06 | 40 | 0.8961 | |
| IV | 2.14 | 125 | 0.8910 | 2,310 |
| V | | | | |
| VI | 2.44 | 155 | 0.8992 | 4,940 |
| VII | | | Frothy | Brittle |

[a] G. of polymer/g. of TiCl₃ for 2 hour run.
[b] Extrapolated values.
[c] Ball-milled for 6 days.
[d] Al/Ti=2.
[e] Equimolar mixture of TiCl₃ and CuCl, ball-milled for 3 days.

It can be seen from the above table that in Examples I through IV which employ the catalyst of the invention, excellent catalyst efficiencies and polymer properties result. It is particularly interesting to note that in Examples I and II, the catalyst efficiencies are markedly higher than the catalyst efficiency of Example VI which employs a very excellent prior art catalyst, namely, titanium trichloride activated with triethyl aluminum.

*Examples VIII through XII*

In these examples transition metal compounds other than TiCl₄ were employed to demonstrate that the method is applicable to a wide range of transition metal compounds. The conditions of catalyst preparation are given in Table II and the polymerization reactions using these catalysts are given in Table III.

TABLE II [1]

| Example | Metal Halide (g.) | Cu, g. | Diluent (ml.) | Reflux Period, Hrs. | Yield, g. |
|---|---|---|---|---|---|
| VIII | TiBr₄ (190) | 31.8 | Toluene (250) | 20 | 195 |
| IX | VCl₄ (18.2) | 5.0 | CCl₄ (350) | 40 | 23 |
| X | VOCl₃ (9.2) | 5.0 | CCl₄ (350) | 60 | 14 |
| XI | VCl₄ (15.3) / TiCl₄ (17.3) | 10.0 | CCl₄ (350) | 90 | 28 |
| XII | VCl₄ (2.9) / TiCl₄ (27.7) | 10.0 | CCl₄ (350) | 45 | 17 |

[1] In all examples the metal halide or halide mixture was added in solution to a refluxing diluent slurry of Cu. The products are solid.

TABLE III

| Example | VIII | IX | X | XI [1] | XI | XII |
|---|---|---|---|---|---|---|
| Feed & Diluent: | | | | | | |
| Propylene, g | 75 | 75 | 75 | 75 | 75 | 75 |
| Xylene, ml | 50 | 50 | 50 | 50 | 50 | 50 |
| Catalyst: | | | | | | |
| Metal Halide, g | 1.08 | 0.64 | 0.75 | 0.64 | 0.78 | 0.64 |
| AlEt₃, g | 0.57 | 0.57 | 0.57 | 0.57 | 0.57 | 0.57 |
| Reaction Conditions: | | | | | | |
| Temperature, °C | 80 | 80 | 80 | 80 | 80 | 80 |
| Run Length, hrs | 2 | 2 | 2 | 2 | 2 | 2 |
| Results: | | | | | | |
| Solid Polymer Yield, g | 25 | 31 | 28 | 60 | 40 | 4 |
| Polymer density, g./cc | | | | 0.8803 | 0.8813 | 0.9261 |

[1] Ball milled for 3 days.

It can be seen from the above table that polymerization of alpha olefins can be carried out using the catalysts of the invention employing various transition metal compounds.

*Example XIII*

In a reaction flask containing 1 liter of normal heptane is introduced an amount of cocrystallized $TiBr_3 \cdot CuBr$ and triethyl aluminum to provide a total catalyst concentration of about 0.12 wt. percent, based on the weight of the solvent present. The molar ratio of triethyl aluminum to $TiBr_3 \cdot CuBr$ is about 2. Into this solution is introduced a mixture consisting of 70 mole percent propylene and 30 mole percent ethylene. Monomer addition is continued until the diluent is substantially saturated. The reaction flask is then heated to a temperature of 70° C. and is maintained at this temperautre for a period of about 2 hours. After the completion of the polymerization, the reaction mixture is contacted with 500 ml. of methanol and a solid polymer product is separated from the reaction mixture. A white elastomeric copolymer of ethylene and propylene is obtained.

*Example XIV*

Following the procedure of Example XIII above, a monomer mixture consisting of 60 mole percent propylene and 40 mole percent 1-butene is introduced in place of the mixture of ethylene and propylene, into a reaction flask containing a catalytic amount of cocrystallized $VOCl_2 \cdot CuCl$ and triisobutyl aluminum in normal heptane. The molar ratio of triisobutyl aluminum to $VOCl_2 \cdot CuCl$ is about 1.5. The polymerization is conducted at a temperature of 80° C. for a period of about 2 hours. At the completion of the polymerization reaction, the reaction mixture is contacted with methanol and a copolymer of propylene and butene-1 is obtained.

*Example XV*

A 2-liter, 4-neck, glass reaction flask is fitted with a stainless steel agitator, thermometer, gas inlet and outlet tubes. The flask is flushed with dry nitrogen and 1 liter of dry normal heptane is placed in the flask under nitrogen pressure. The normal heptane is then saturated with a monomer mixture consisting of 70 mole percent propylene and 30 mole percent ethylene. The rate of introduction of the monomer mixture into the normal heptane is about 3 liters per minute.

The polymerization catalyst consisting of 0.25 millimole of cocrystallized $VCl_3 \cdot CuCl$ and 1.34 moles of diethyl aluminum chloride is then introduced to the saturated diluent. Upon completion of catalyst addition, 0.06 mole of 5-methylene-2-norbornene is added to the reaction mixture. The reaction mixture is then maintained at a temperature of 70° C. for a period of 60 minutes. The ethylene-propylene mixture is permitted to bubble through the reaction mixture over the entire reaction period. At the completion of the reaction period, the catalyst is deactivated with 20 mls. of isopropyl alcohol and the resulting slurry is then poured into 2 liters of an acetone-methanol mixture. The polymer product is then washed and dried, giving a substantial yield of a soft, attractive elastomer having an iodine number of about 10. The terpolymer obtained is readily sulfur curable.

Modifications of the process in the invention can be made without departing from the scope and spirit of the invention.

What is claimed is:

1. A process for polymerizing an alpha olefin having from 2 to 20 carbon atoms which comprises the steps of contacting said alpha olefin in a hydrocarbon diluent at a temperature of from 0 to 150° C. with a polymerization catalyst comprising a transition metal compound selected from the group consisting of titanium and vanadium halides and oxyhalides cocrystallized with the corresponding cuprous halide, and activated with an organo metallic compound to polymerize said alpha olefin.

2. The process of claim 1 wherein the polymerization catalyst comprises a reduction product comprising a metal compound selected from the group consisting of $TiCl_3$, $TiBr_3$, $VCl_3$, and $VOCl_2$ cocrystallized with CuX, wherein X is the same halogen as the halogen in the metal compound, and activated with a lower alkyl aluminum compound.

3. The process of claim 2 wherein the molar ratio of metal compound to CuX in the reduction product varies in the range of from about 1:1 to 3:1.

4. The process of claim 3 wherein the reduction product catalyst is dry metal ball milled for a period of 2 hours to 10 days prior to contact with olefins.

5. The process of claim 3 wherein from 0.1 to 10 moles of the lower alkyl aluminum compound is present per mole of said reduction product.

6. The process of claim 5 wherein the lower alkyl aluminum compound is a trialkyl aluminum.

7. The process of claim 6 wherein the reduction product is $TiCl_3$ cocrystallized with CuCl and the lower alkyl aluminum compound is aluminum triethyl.

8. The process of claim 2 wherein the alpha olefin has from 3 to 5 carbon atoms and the polymerization is conducted at a temperature in the range of from about 70 to 130° C.

9. The process of claim 7 wherein the olefin is propylene.

10. The process of claim 7 wherien the olefins are ethylene and propylene.

11. The process of claim 7 wherein the olefins are propylene and butene-1.

12. The process for polymerizing at least one alpha olefin having from 2 to 20 carbon atoms with a $C_6$ to $C_{15}$ non-conjugated diolefin which comprises contacting said alpha olefin and diolefin in a hydrocarbon diluent at a temperature of from about −40 to 150° C. with a polymerization catalyst comprising a transition metal compound selected from the group consisting of titanium and vanadium halides and oxyhalides cocrystallized with the corresponding cuprous halide, and activated with an organo metallic compound to polymerize said alpha olefin and diolefin.

13. The process of claim 12 wherein the polymerization catalyst comprises a reduction product comprising a metal compound selected from the group consisting of $TiCl_3$, $TiBr_3$, $VCl_3$, and $VOCl_2$ cocrystallized with CuX, wherein X is the same halogen as the halogen in the metal compound, and activated with a lower alkyl aluminum compound.

14. The process of claim 13 wherein the molar ratio of metal compound to CuX in the reduction product varies in the range of from about 1:1 to 3:1.

15. The process of claim 14 wherein the reduction product catalyst is dry metal ball milled for a period of about 2 hours to 10 days prior to contact with olefins.

16. The process of claim 14 wherein from 0.1 to 10 moles of the lower alkyl aluminum compound is present per mole of said reduction product.

17. The process of claim 16 wherein the alpha olefins have from 3 to 5 carbon atoms and the polymerization is conducted at a temperature in the range of from about 20 to 100° C.

18. The process of claim 17 wherein the alpha olefins are ethylene and propylene and the non-conjugated diolefin is 5-methylene-2-norbornene.

No references cited.

JOSEPH L. SCHOFER, *Primary Examiner.*

M. B. KURTZMAN, *Assistant Examiner.*